United States Patent
Allen et al.

(10) Patent No.: US 6,449,950 B1
(45) Date of Patent: Sep. 17, 2002

(54) ROTOR AND BEARING SYSTEM FOR ELECTRICALLY ASSISTED TURBOCHARGER

(75) Inventors: John Allen, Torrance, CA (US); Gerald Duane LaRue, Torrance, CA (US); Elias E. Barrios, Torrance, CA (US); Gerhard Delf, Santa Barbara, CA (US)

(73) Assignee: Honeywell International Inc., Morristown, NJ (US)

( * ) Notice: Subject to any disclaimer, the term of this patent is extended or adjusted under 35 U.S.C. 154(b) by 143 days.

(21) Appl. No.: 09/659,990

(22) Filed: Sep. 12, 2000

(51) Int. Cl.[7] ................................. F02B 33/44
(52) U.S. Cl. ........................ 60/607; 417/407
(58) Field of Search .............. 60/608, 607; 417/407

(56) References Cited

U.S. PATENT DOCUMENTS

| | | | |
|---|---|---|---|
| 3,811,741 A | | 5/1974 | McInerney et al. .......... 417/407 |
| 4,253,031 A | * | 2/1981 | Frister .......................... 60/607 |
| 4,355,850 A | * | 10/1982 | Okano ......................... 417/407 |
| 4,474,484 A | | 10/1984 | MacInnes et al. .......... 384/215 |
| 4,827,170 A | * | 5/1989 | Kawamura et al. ......... 417/407 |
| 4,884,406 A | * | 12/1989 | Kawamura ................... 60/608 |
| 4,924,674 A | * | 5/1990 | Hara et al. .................... 60/608 |
| 5,121,605 A | * | 6/1992 | Oda et al. ..................... 60/608 |
| 5,857,332 A | | 1/1999 | Johnston et al. ............ 417/407 |
| 5,883,173 A | * | 11/1999 | Koike et al. ................. 417/407 |
| 6,017,184 A | * | 1/2000 | Aguilar et al. .............. 417/407 |
| 6,032,466 A | | 3/2000 | Woollenweber et al. .... 417/407 |

* cited by examiner

Primary Examiner—Thomas Denion
Assistant Examiner—Thai-Ba Trieu
(74) Attorney, Agent, or Firm—Ephraim Starr; Felix Fischer

(57) ABSTRACT

A turbocharger having an electric motor for assisting spin up of the rotor employs a shaft carrying the turbine and compressor impeller with a unitary pinned semi-floating bearing supporting the shaft and a spacer collar carrying the electric motor magnet. The unitary bearing has integral thrust faces engaging a hub of the turbine wheel and the spacer collar. A reduced diameter of the shaft received in the spacer collar allows the collar to engage a greater diameter bearing land allowing the attachment of the compressor impeller with a nut on the shaft extending through a bore in the impeller to firmly engage the impeller, spacer collar and bearing land of the shaft to fix the rotor length. The pinned semi-floating bearing with integral thrust faces provides enhanced reaction moments for negative spring forces created by the electric motor in operation and the additional length of the rotor created by the motor.

6 Claims, 1 Drawing Sheet

ROTOR AND BEARING SYSTEM FOR ELECTRICALLY ASSISTED TURBOCHARGER

FIELD OF THE INVENTION

This invention relates generally to the field of electrically assisted turbochargers and, more particularly, to an improved rotating group with unitary bearing assembly.

BACKGROUND OF THE INVENTION

The use of turbochargers for boosting charge air in internal combustion engines has been demonstrated as an efficient means for increasing power output and efficiency of the engine. The use of otherwise wasted energy in the exhaust gas of the engine to drive the turbocharger contributes to its efficiency as a boosting device. However, the reliance on exhaust gas contributes to an effect known as "turbo lag" in developing power in the engine for acceleration. Boost provided by the turbocharger is dependant on the exhaust energy. Consequently, upon demand for immediate power, the addition of fuel to the charge supplied to the engine occurs first with exhaust energy building slowly increasing energy to the turbine of the turbocharger which, in turn, drives to compressor through the interconnecting shaft to provide boost pressure through the turbocharger in a "boot strapping" effect.

Turbo lag can be reduced or eliminated through the addition to the turbocharger of an electric motor that can add energy to the spinning rotor group independent of the actual exhaust energy. The addition of the electric motor allows spin up of the rotor substantially instantaneously to match fuel and boost for the desired power output, with electrical power input being reduced as the exhaust energy becomes sufficient to sustain the necessary level of boost.

The addition of the electrical motor as an integral portion of the rotor group adds to the length and alters the dynamic characteristics of the rotor. To maintain efficient operation of the turbocharger, alterations in the bearing system and rotor are, therefore, required. Improved floating journal bearing systems such as that disclosed in U.S. Pat. No. 5,857,332 entitled BEARING SYSTEMS FOR MOTOR-ASSISTED TURBOCHARGERS FOR INTERNAL COMBUSTION ENGINES, issues on Jan. 12, 1999, provide one approach to achieving such alterations. However, it is desirable to create a rotor and bearing system with increased efficiency and robustness to accommodate the electrically assisting motor system in the turbocharger.

SUMMARY OF THE INVENTION

A turbocharger incorporating the rotor and bearing system of the present invention includes a turbine wheel carried in a turbine housing to receive exhaust gas from an internal combustion engine. The turbine wheel is attached to a shaft by intertial welding or similar means and incorporates a hub portion which includes a piston seal engaging the turbocharger center housing. A compressor impeller is attached to the shaft at the opposite end from the turbine and carried within a compressor housing which receives the inlet air and includes a diffuser and volute to carry boosted air from the compressor to the engine intake system. A bearing portion of the shaft adjacent to the turbine hub includes two bearing lands separated by a relieved section. The lands interface with a pinned semi-floating unitary bearing carried in a bearing bore in the center housing. The unitary bearing includes a first thrust bearing face engaging the turbine hub. A permanent magnet for the electric motor is carried by a spacer collar which is received over a collar portion of the shaft extending from the bearing portion opposite the turbine hub and the unitary bearing incorporates a second thrust face engaging the spacer collar. The spacer collar also includes a piston seal engaging the center housing. The spacer collar engages the compressor impeller to maintain the fixed length of the rotor.

BRIEF DESCRIPTION OF THE DRAWINGS

The present invention will be more clearly understood with respect to the following drawings and detailed description.

DETAILED DESCRIPTION OF THE INVENTION

Figure 1:
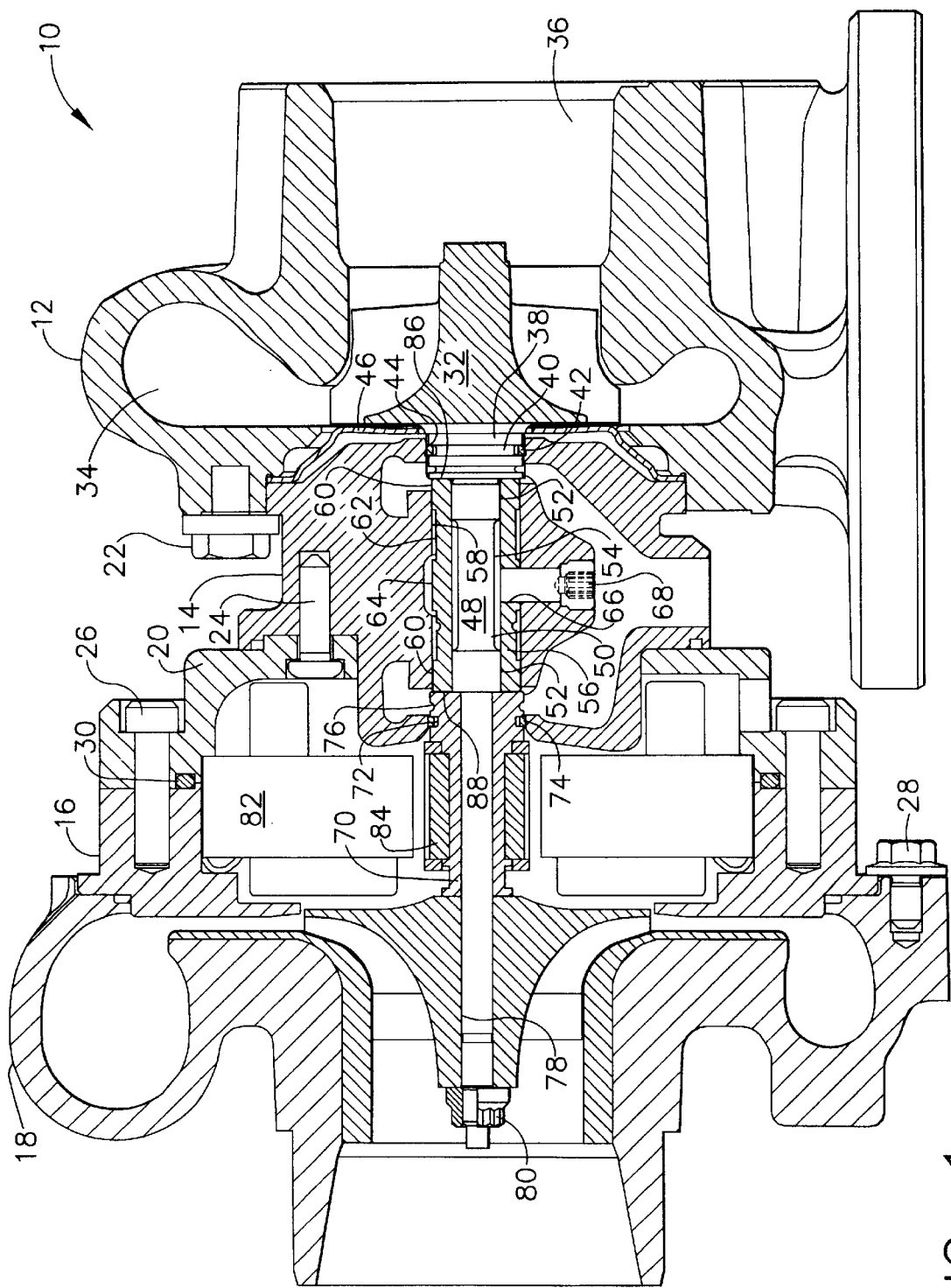
FIG. 1 is a side section view of a turbocharger employing the present invention in its rotor and bearing arrangement.

Referring to the drawing, A turbocharger 10 incorporating the present invention includes a turbine housing 12 attached to a center housing 14. A compressor housing 16 is attached to the center housing using a back plate 18, which includes a first portion of a motor housing, and a motor housing casting 20. In the drawing, the attachment of the turbine housing to the center housing is accomplished by bolts 22, with attachment of the center housing to the motor housing casting by bolts 24, the motor housing casting to the back plate by bolts 26 and the back plate to the compressor housing by bolts 28. Sealing of the motor housing is accomplished by O-ring 30. Other embodiments of turbochargers incorporating the invention employ alternative fastening arrangements including v-band clamps.

The rotor for the turbocharger has a turbine 32 carried within the turbine housing. Exhaust gas enters the turbine housing through the volute 34 to flow through the turbine blades and exit through the outlet 36. The turbine includes a hub portion 38 that incorporates a groove 40 to retain a piston ring 42. The piston ring engages a land 44 on the center housing through bore to provide a seal preventing lubricating oil flow into the turbine housing and exhaust system. In the embodiment shown, a heat shroud 46 is engaged between the turbine housing and center housing for thermal aerodynamic control enhancement.

A rotor shaft 48 is attached to the turbine hub using inertial welding. The shaft includes a bearing portion 50 having lands 52 separated by a relieved section 54. A unitary bearing 56 is carried in a bearing bore 58 of the center housing. The bearing is semi-floating, having journals 60 at each end with lubrication and film damper relief portions 62. A central shoulder 64 incorporates an aperture 66 to receive a pin 68 to restrain rotation of the bearing.

Adjacent the bearing portion and opposite the turbine, the shaft diameter is reduced to carry a spacer collar 70. The collar incorporates a groove 72 carrying a piston ring 74 to engage the center bore of the center housing to seal the compressor section from lubricating oil. An oil slinger 76 is machined into the collar in the embodiment shown. The compressor wheel abuts the collar. In the embodiment shown in the drawings, the compressor wheel is attached to the shaft using a through bore 78 and nut 80. The rotor dimensional tolerance is controlled by tightening the nut on the compressor wheel to firmly engage the spacer collar which, in turn, engages the adjacent larger diameter of journal on the bearing portion of the shaft. The electric motor for the electrically assisted turbocharger includes a wound stator 82 carried in the motor housing and a permanent magnet 84 is mounted on the collar. The frictional engagement of the compressor wheel, spacer collar and the bearing land of the shaft fixes the entire rotating group of the turbocharger allowing operation of the motor to turn the rotor without additional attachment of the collar and magnet to the shaft.

The unitary bearing incorporates a first thrust face 86 which engages the turbine wheel hub and a second thrust face 88 which engages the collar. The bearing arrangement of the present invention accommodates the additional rotor length required by the electric motor. Further, the combination of the pinned semi-floating bearing with the integral thrust faces provides counteracting moment for negative spring force that can be generated by the magnet and stator of the electric motor during operation. The individual effects of counteracting moment from the thrust faces and the pinned unitary bearing are complementary providing enhanced performance over the effect each would provide alone.

Having now described the invention in detail as required by the patent statutes, those skilled in the art will recognize modifications and substitutions to the specific embodiments disclosed herein. Such modifications are within the scope and intent of the present invention.

What is claimed is:

1. A rotor and bearing for a turbocharger for internal combustion engines comprising:

a turbine wheel carried in a turbine housing to receive exhaust gas from an internal combustion engine, the turbine wheel incorporating a hub portion attached to a shaft extending through a center housing;

a compressor impeller attached to the shaft opposite the turbine and carried within a compressor housing;

a bearing portion of the shaft adjacent the turbine hub including two bearing lands separated by a relieved section, the lands received within a pinned semi-floating unitary bearing carried in a bearing bore in the center housing, the unitary bearing including a first thrust bearing face engaging the turbine hub;

a permanent magnet for an electric motor carried by a spacer collar which is received over a collar portion of the shaft extending from the bearing portion opposite the turbine hub and the unitary bearing further incorporates a second thrust face engaging the spacer collar.

2. A rotor and bearing as defined in claim 1 wherein the turbine hub includes a piston seal engaging a center bore in the center housing and the spacer collar includes a piston seal engaging the center bore.

3. A rotor and bearing as defined in claim 1 wherein shaft diameter is reduced in the collar portion and the spacer collar further engages the compressor impeller and a bearing land on the shaft to maintain a fixed length of the rotor.

4. A rotor and bearing for a turbocharger for internal combustion engines comprising:

a turbine wheel carried in a turbine housing to receive exhaust gas from an internal combustion engine, the turbine wheel incorporating a hub portion attached to a shaft extending through a center housing;

a compressor impeller attached to the shaft opposite the turbine and carried within a compressor housing;

a rotor assembly for an electric motor received over the shaft;

a pinned semi-floating unitary bearing carried in a bearing bore in the center housing, the unitary bearing receiving the shaft intermediate the turbine hub and the rotor assembly, and including a first thrust bearing face engaging the turbine hub and a second thrust face engaging the rotor assembly.

5. A rotor and bearing for a turbocharger as defined in claim 4 wherein the rotor assembly comprises:

a permanent magnet;

a collar carrying the permanent magnet, the collar engaging the second thrust bearing face of the unitary bearing.

6. A rotor and bearing for a turbocharger for internal combustion engines comprising:

a turbine wheel carried in a turbine housing to receive exhaust gas from an internal combustion engine, the turbine wheel incorporating a hub portion attached to a shaft extending through a center housing;

a compressor impeller attached to the shaft opposite the turbine and carried within a compressor housing;

a permanent magnet assembly for an electric motor received over the shaft;

a pinned semi-floating unitary bearing carried in a bearing bore in the center housing, the unitary bearing receiving the shaft intermediate the turbine hub and the magnet assembly, and including means for engaging the turbine hub for thrust force reaction in a first direction and means for engaging the permanent magnet assembly for thrust force reaction in a second direction.

\* \* \* \* \*